United States Patent
Sugimoto (10) Patent No.: US 9,826,282 B2
(45) Date of Patent: Nov. 21, 2017

(54) RECEPTION APPARATUS, RECEPTION METHOD, AND RECORDING MEDIUM

(71) Applicant: CANON KABUSHIKI KAISHA, Tokyo (JP)

(72) Inventor: Shun Sugimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 14/319,211

(22) Filed: Jun. 30, 2014

(65) Prior Publication Data

US 2015/0010090 A1 Jan. 8, 2015

(30) Foreign Application Priority Data

Jul. 2, 2013 (JP) ................. 2013-139048

(51) Int. Cl.
| | |
|---|---|
| *H04N 19/68* | (2014.01) |
| *H04N 19/436* | (2014.01) |
| *H04N 19/66* | (2014.01) |
| *H04N 21/6437* | (2011.01) |
| *H04N 21/61* | (2011.01) |
| *H04N 21/63* | (2011.01) |
| *H04N 21/643* | (2011.01) |

(Continued)

(52) U.S. Cl.
CPC ..... *H04N 21/6437* (2013.01); *H04L 65/4015* (2013.01); *H04L 65/604* (2013.01); *H04L 65/608* (2013.01); *H04L 65/80* (2013.01); *H04N 21/6125* (2013.01); *H04N 21/631* (2013.01); *H04N 21/64322* (2013.01); *H04N 21/40* (2013.01)

(58) Field of Classification Search
None
See application file for complete search history.

(56) References Cited

U.S. PATENT DOCUMENTS

| | | | | |
|---|---|---|---|---|
| 5,903,238 A | * | 5/1999 | Sokat | H04B 7/10 342/361 |
| 6,317,429 B1 | * | 11/2001 | Nakata | H04J 3/08 370/360 |

(Continued)

FOREIGN PATENT DOCUMENTS

| | | |
|---|---|---|
| JP | 2003-224839 A | 8/2003 |
| JP | 2007306167 A | 11/2007 |

OTHER PUBLICATIONS

Jinna et al., "Real-time guaranteed cost control of MIMO networked control system with packet disordering", Journal of Process Control, pp. 967-975, vol. 21, Issue 6, Jul. 2011.*

*Primary Examiner* — Mohammad J Rahman
(74) *Attorney, Agent, or Firm* — Canon U.S.A., Inc. IP Division (57) ABSTRACT

A reception apparatus includes a plurality of reception units each corresponding to a communication path among a plurality of communication paths, and a generation unit configured to, in a case where the plurality of reception units receives a first data unit and a second data unit, generate the first data unit at a first time corresponding to a time at which the plurality of reception units has completed reception of data forming the first data unit, and generate the second data unit at a second time corresponding to a time at which the plurality of reception units has completed reception of data forming the second data unit.

13 Claims, 7 Drawing Sheets

(51) Int. Cl.
*H04L 29/06* (2006.01)
*H04N 21/40* (2011.01)

(56) References Cited

U.S. PATENT DOCUMENTS

| | | | | |
|---|---|---|---|---|
| 6,788,686 B1* | 9/2004 | Khotimsky | H04L 47/10 | 370/389 |
| 7,428,244 B2* | 9/2008 | Nilsson | H04L 12/1886 | 370/235 |
| 7,558,323 B2* | 7/2009 | Aikawa | H04N 7/18 | 375/240.25 |
| 7,593,424 B2* | 9/2009 | Yamane | H04N 21/4382 | 370/464 |
| 8,457,220 B2* | 6/2013 | Suh | H04B 7/0619 | 375/260 |
| 8,462,946 B2* | 6/2013 | Doehla | H04N 21/85406 | 380/212 |
| 8,473,632 B2* | 6/2013 | Morimura | H04L 49/90 | 709/230 |
| 8,483,339 B2* | 7/2013 | Watanabe | H04B 7/0814 | 375/260 |
| 9,049,350 B2* | 6/2015 | Sugimoto | H04N 7/181 | |
| 9,641,588 B2* | 5/2017 | Rozenberg | H04L 65/80 | |
| 2004/0114032 A1* | 6/2004 | Kakii | H04N 7/142 | 348/14.08 |
| 2004/0177267 A1* | 9/2004 | Tada | H04N 21/234318 | 713/193 |
| 2006/0036797 A1* | 2/2006 | Merlet | H04L 12/2838 | 710/311 |
| 2006/0039462 A1* | 2/2006 | Choi | H04L 1/0041 | 375/240.01 |
| 2007/0046998 A1* | 3/2007 | Ohnishi | H04N 1/46 | 358/3.1 |
| 2007/0230493 A1* | 10/2007 | Dravida | H04L 47/14 | 370/412 |
| 2008/0013550 A1* | 1/2008 | Yamauchi | H04L 47/10 | 370/400 |
| 2009/0010430 A1* | 1/2009 | Tada | H04N 21/234318 | 380/217 |
| 2009/0040216 A1* | 2/2009 | Ishiyama | G06T 17/20 | 345/419 |
| 2010/0125768 A1* | 5/2010 | Mauchly | H04L 1/1829 | 714/749 |
| 2010/0177655 A1* | 7/2010 | Duenyas | H04W 24/06 | 370/252 |
| 2010/0189256 A1* | 7/2010 | Doehla | H04N 21/85406 | 380/217 |
| 2010/0195551 A1* | 8/2010 | Kuwana | H04W 52/0235 | 370/311 |
| 2010/0238926 A1* | 9/2010 | Miyakawa | G06F 13/385 | 370/390 |
| 2011/0044315 A1* | 2/2011 | Horio | H04L 45/24 | 370/345 |
| 2011/0080852 A1* | 4/2011 | Kishimoto | H04N 1/00204 | 370/255 |
| 2011/0134987 A1* | 6/2011 | Watanabe | H04B 7/0814 | 375/229 |
| 2011/0141916 A1* | 6/2011 | Inohiza | H04B 7/155 | 370/246 |
| 2011/0194568 A1* | 8/2011 | Ozawa | H04L 1/0002 | 370/465 |
| 2011/0243217 A1* | 10/2011 | Sanjeewa | H04N 21/2404 | 375/240.01 |
| 2012/0051305 A1* | 3/2012 | Wang | H04L 1/1812 | 370/329 |
| 2012/0327779 A1* | 12/2012 | Gell | H04L 47/6275 | 370/238 |
| 2013/0201940 A1* | 8/2013 | Zhang | H04W 52/12 | 370/329 |
| 2013/0258120 A1* | 10/2013 | Sugimoto | H04N 7/181 | 348/207.1 |
| 2014/0119459 A1* | 5/2014 | Kumar | H04N 19/00933 | 375/240.27 |
| 2014/0143824 A1* | 5/2014 | Bae | H04N 19/51 | 725/116 |
| 2014/0164640 A1* | 6/2014 | Ye | H04L 47/12 | 709/235 |
| 2014/0173677 A1* | 6/2014 | Lohmar | H04N 19/895 | 725/116 |
| 2015/0304684 A1* | 10/2015 | Donley | H04L 1/00 | 714/776 |

* cited by examiner

| 1 | 2 | 3 | 4 |
|---|---|---|---|
| 5 | 6 | 7 | 8 |
| 9 | 10 | 11 | *12 |

Frame1

| 13 | 14 | 15 | 16 |
|---|---|---|---|
| 17 | 18 | 19 | 20 |
| 21 | 22 | 23 | *24 |

Frame2

| X | X = SEQUENCE NUMBER |
|---|---|
| | * = Marker bit |

RECEPTION APPARATUS, RECEPTION METHOD, AND RECORDING MEDIUM

BACKGROUND OF THE INVENTION

Field of the Invention

The present invention relates to a reception apparatus, a reception method, and recording medium.

Description of the Related Art

Nowadays, media transmission using an Internet Protocol (IP) network, such as the Internet, is widely available. In the media transmission, media data, such as a moving image and a sound, captured with a camera or the like can be transmitted in real time through a network. A Transport Protocol for Real-Time Applications, RFC 3550, IETF (RTP) is used as such a protocol.

In addition, moving images are now in higher definition, and the demand for a greater variety of media data is on the rise as smartphones and tablets become more widely available. Accordingly, media transmission requires a high capacity network band, and development of the networking infrastructure as well as efficient use of the network bands are required.

Techniques for efficiently using the network bands include a multipath transmission technique for a higher capacity, in which a plurality of available network interfaces (I/Fs) is used in parallel. Multipath Transmission Control Protocol (TCP) (refer to Architectural Guidelines for Multipath TCP Development, RFC 6182, IETF) is an example of a protocol that supports the multipath transmission. In addition, Multipath Realtime Transport Protocol (RTP) and Concurrent Multipath Transfer using Stream Control Transmission Protocol (CMT-SCTP) are other examples of such a protocol.

In the multipath transmission, a receiving client apparatus includes a plurality of network I/Fs and temporary reception buffers corresponding to the respective network I/Fs. The receiving client apparatus uses the network I/Fs in parallel to receive packets and successively stores the received packets into the reception buffers. The receiving client apparatus then performs re-order processing to pass packet data received in the plurality of reception buffers to an upper layer module. In the re-order processing, the order of the pieces of data is switched, and the pieces of data are reconstructed into a single piece of data.

As a technique relating to a timing at which the received data is passed to the upper layer module, Japanese Patent Application Laid-Open No. 2003-224839 discusses a technique in which decoding processing is performed at a timing at which a final video packet is received.

In the multipath transmission, there may be a situation in which a communication zone, a delay time, and so on differ among a plurality of paths. Thus, desired is a technique that allows media data to be reproduced without a delay by starting the re-order processing at an appropriate timing even in the aforementioned situation.

SUMMARY OF THE INVENTION

The present invention is directed to a technique for optimizing a re-order timing in multipath transmission, and improving real-time reproduction performance and reproduction quality of media data.

According to an aspect of the present invention, a reception apparatus includes a plurality of reception units each corresponding to a communication path among a plurality of communication paths, and a generation unit configured to, in a case where the plurality of reception units receives a first data unit and a second data unit, generate the first data unit at a first time corresponding to a time at which the plurality of reception units has completed reception of data forming the first data unit, and generate the second data unit at a second time corresponding to a time at which the plurality of reception units has completed reception of data forming the second data unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
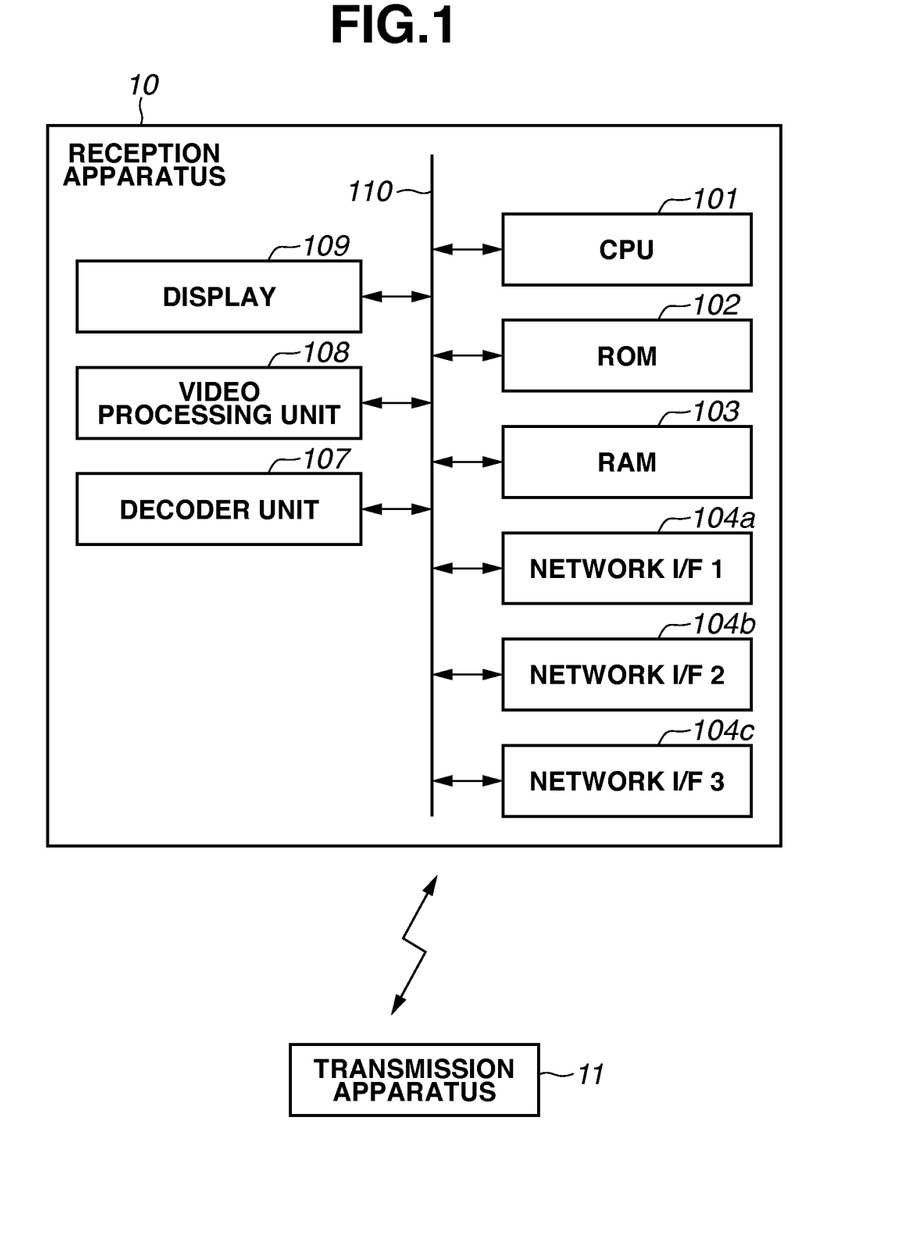
FIG. 1 is a diagram illustrating a reception apparatus.

FIG. 1 is a diagram illustrating a hardware configuration of a reception apparatus 10. The reception apparatus 10 according to a first exemplary embodiment receives media data, in real time, in packet units through multipath transmission, which uses a plurality of communication paths in parallel. The media data is an example of data to be received. The media data, for example, is data of a video image, a sound, and so on. As other examples of the media data, the media data may include metadata, error correction code data for enhancing error resistance of data, and so on.

The reception apparatus 10 and a transmission apparatus 11 may each be implemented by a single computer apparatus. Alternatively, functions of each of the reception apparatus 10 and the transmission apparatus 11 may be distributed among a plurality of computer apparatuses, and each of the reception apparatus 10 and the transmission apparatus 11 may be implemented by a plurality of computer apparatuses. In a case where each of the reception apparatus 10 and the transmission apparatus 11 is implemented by the plurality of computer apparatuses, the computer apparatuses are communicably interconnected through a network, such as a local area network (LAN).

A central processing unit (CPU) 101 integrally controls each component of the reception apparatus 10. A read only memory (ROM) 102 stores a control program and so on to be executed by the CPU 101. A random access memory (RAM) 103 functions as a main memory, a work area, and so on of the CPU 101.

The functions of the reception apparatus 10 and processing performed by the reception apparatus 10 are implemented as the CPU 101 loads a program stored in the ROM 102 or the like and executes the program.

Network I/Fs 104a to 104c are interfaces that can connect to the Internet, a public wireless network, or a LAN. While the reception apparatus 10 includes the three network I/Fs 104a to 104c in the present exemplary embodiment, as long as the reception apparatus 10 includes two or more network I/Fs, the number of the network I/Fs is not limited to the present exemplary embodiment. The network I/Fs 104a to 104c receive the media data from the transmission apparatus 11 in packet units and store the received media data into the RAM 103.

A decoder unit 107 converts the media data to be stored in the RAM 103 through a specific encoding system, such as H.265 and the joint photographic expert group (JPEG). A video processing unit 108 performs processing, such as noise removal and color tone correction, on the video data decoded by the decoder unit 107. A display 109 displays the video data processed by the video processing unit 108. A bus 110 is a transfer path for the various pieces of data.

As another example, the reception apparatus 10 may not include the decoder unit 107, the video processing unit 108, the display 109, and so on. In such a case, the reception apparatus 10 may be connected to an external device that includes the decoder unit 107, the video processing unit 108, and the display 109.

Figure 2:
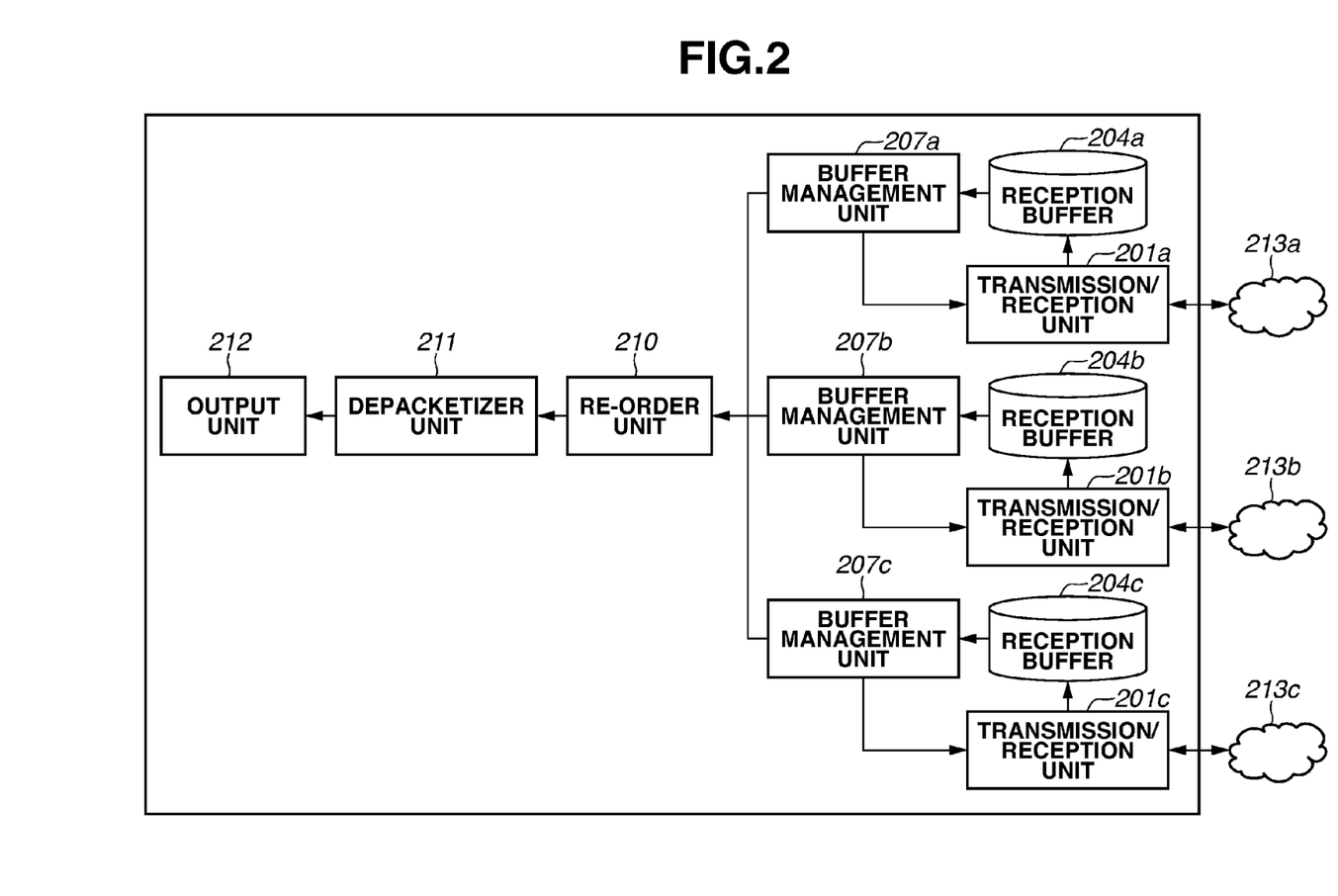
FIG. 2 is a diagram illustrating a software configuration of the reception apparatus.

FIG. 2 is a diagram illustrating a software configuration of the reception apparatus 10. Transmission/reception units 201a to 201c correspond to the network I/Fs 104a to 104c, respectively. The transmission/reception units 201a to 201c, through receiving functions thereof, receive the media data in packet units from the transmission apparatus 11 through networks 213a to 213c, respectively. The transmission/reception units 201a to 201c store the received packets into reception buffers 204a to 204c, respectively. The plurality of packets stored in the reception buffers 204a to 204c is managed by buffer management units 207a to 207c, respectively.

The buffer management units 207a to 207c manage information, such as a sequence number, a subflow sequence number, and a marker bit, appended to the packets. The sequence number and so on will be described below with reference to FIG. 3.

The buffer management units 207a to 207c instruct the transmission/reception units 201a to 201c to send re-transmission requests for any missing packet (not-yet-received packet). A re-order unit 210 performs re-order processing for reconstructing the packets stored in the reception buffers 204a to 204c.

A depacketizer unit 211 extracts payloads from the packets re-ordered by the re-order unit 210 and passes the reconstructed media data to an output unit 212. As another example, the depacketizer unit 211 may extract payloads, and the re-order unit 210 may then re-order the payloads based on header information. The output unit 212 outputs the received payloads to the decoder unit 107.

Not all the networks 213a to 213c need to be mutually different networks. It is sufficient if some of the networks 213a to 213c differ from each other.

In addition, the transmission/reception units 201a to 201c, the reception buffers 204a to 204c, and the buffer management units 207a to 207c do not need to be provided within a single memory space. Furthermore, the transmission/reception units 201a to 201c, the reception buffers 204a to 204c, and the buffer management units 207a to 207c may each be implemented through a different program.

Figure 3:
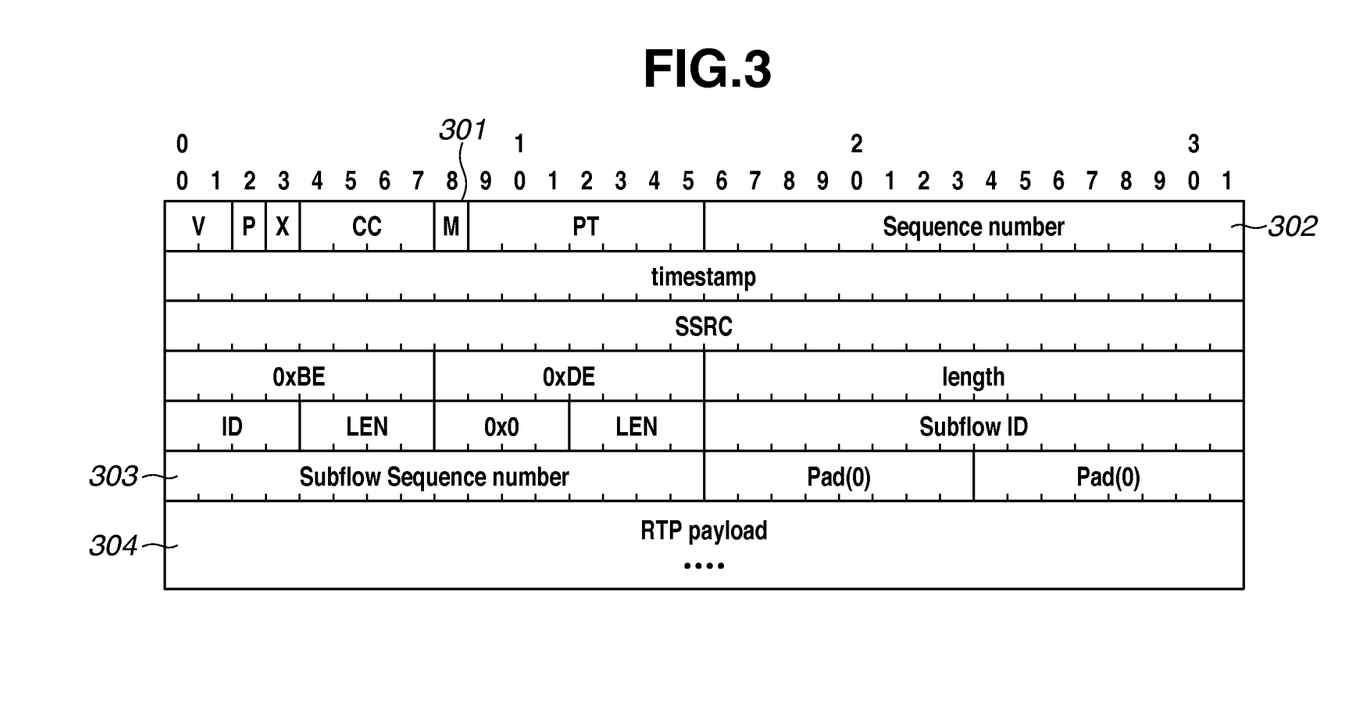
FIG. 3 is a diagram illustrating an example of a data structure of a packet.

FIG. 3 is a diagram illustrating an example of a data structure of a packet to be received by the reception apparatus 10. The reception apparatus 10 according to the present exemplary embodiment receives a multipath RTP packet, and FIG. 3 illustrates a data structure of a multipath RTP packet.

A marker bit 301 is formed by one bit. The marker bit 301 is information for identifying the last packet forming a data unit. The marker bit 301 of the last packet is "ON," and the marker bit 301 of a packet other than the last packet is "OFF."

The media data includes a plurality of data units. For example, in a case of video data, a single video frame constitutes a data unit. The last packet corresponds to a packet arrayed at the end of the data unit. The marker bit 301 is an example of boundary information indicating a boundary position between two successive data units.

A sequence number 302 is formed by 16 bits. A sequence number 302 is a uniquely determined consecutive sequence number within a single piece of media data, which is provided for each packet forming the media data. The sequence number 302 is an example of array information indicating the array sequence. A subflow sequence number 303 is formed by 16 bits. The subflow sequence number 303 is a uniquely determined consecutive subflow sequence number within a single reception path, which is provided for each packet transmitted to a reception path. The subflow sequence number 303 is an example of transmission sequence information indicating the transmission sequence.

Figure 4:
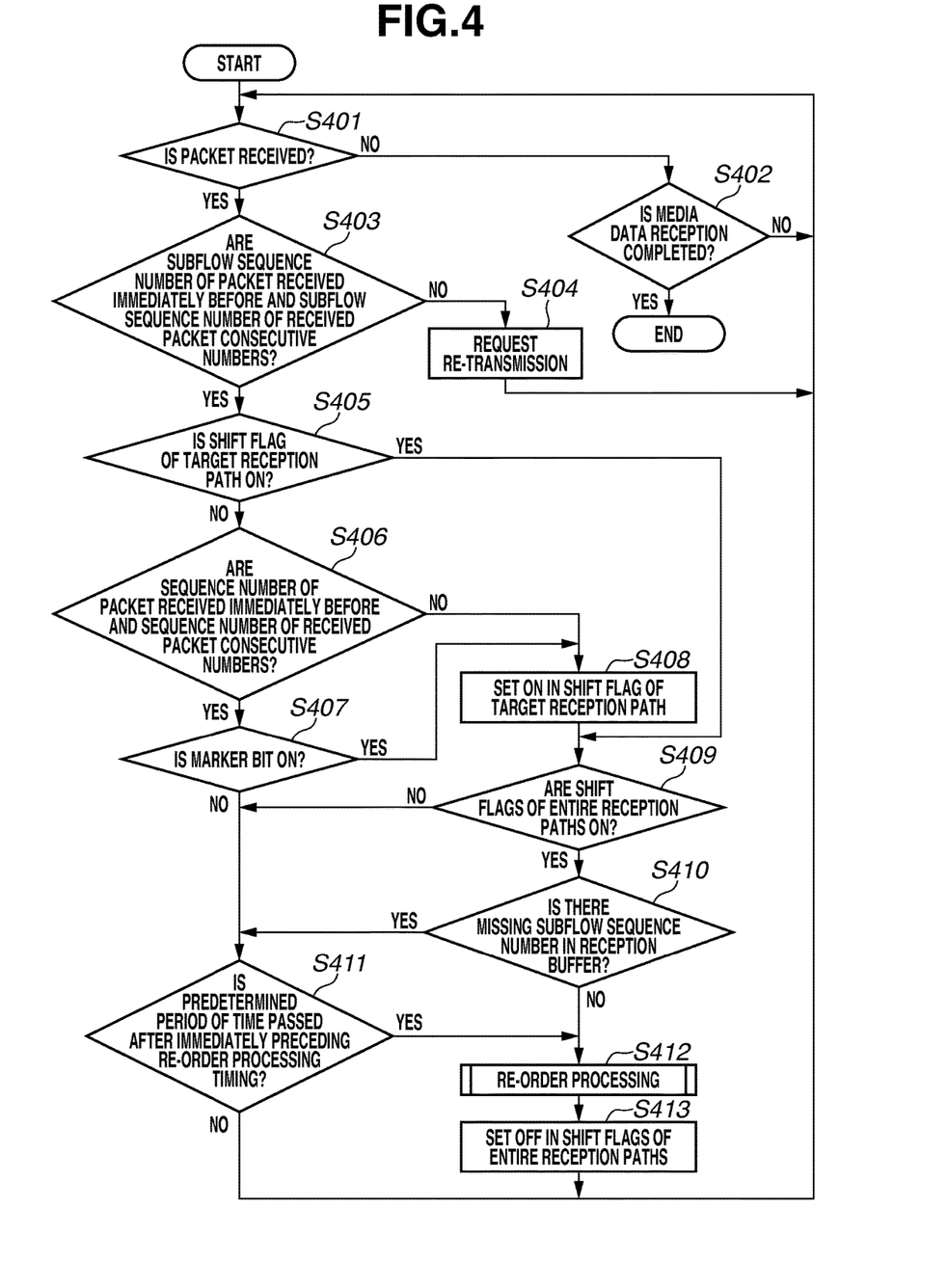
FIG. 4 is a flowchart illustrating reception/transmission processing.

FIG. 4 is a flowchart illustrating reception processing of the reception apparatus 10. The receiving processing illustrated in FIG. 4 includes receiving of media data and re-ordering. In step S401, the CPU 101 monitors reception of packets through the network I/Fs 104a to 104c. If any one of the network I/Fs 104a to 104c has received a packet (YES in step S401), the processing proceeds to step S403. If none of the network I/Fs 104a to 104c receive a packet (NO in step S401), the processing proceeds to step S402. The processing in step S401 is an example of the reception processing.

In step S402, the CPU 101 determines whether reception of media data is completed, or in other words, determines whether reception of the entire packets forming the media data is completed. If it is determined that the reception of the media data is completed (YES in step S402), the CPU 101 terminates the reception processing. If it is determined that the reception of the media data has not been completed (NO in step S402), the processing returns to step S401, and the CPU 101 waits again to receive packets.

In step S403, the CPU 101 extracts a subflow sequence number from a received packet. The CPU 101 then determines whether the subflow sequence number of the received packet and the subflow sequence number of an immediately preceding packet received through a reception path through which the aforementioned packet has been received (hereinafter, referred to as a target reception path) are consecutive numbers.

If it is determined that the two subflow sequence numbers are consecutive numbers (YES in step S403), the processing proceeds to step S405. If it is determined that the two subflow sequence numbers are not consecutive numbers (NO in step S403), the processing proceeds to step S404. A case in which the two subflow sequence numbers are not consecutive numbers indicates that a packet having a subflow sequence number between the subflow sequence number of the received packet and the subflow sequence number of the immediately preceding received packet has not been received. In other words, the case in which it is determined that the two subflow sequence numbers are not consecutive numbers indicates that there is a not-yet-received packet. The processing in step S403 is an example of determination processing of determining the presence of a not-yet-received packet.

In step S404, the CPU 101 transmits, to the transmission apparatus 11, a request that the not-yet-received packet be retransmitted (transmission processing), and the processing then returns to step S401. Then, the CPU 101 waits to receive the not-yet-received packet.

In step S405, the CPU 101 detects ON/OFF of a shift flag of the target reception path. The shift flag is provided for each reception path and is stored, for example, in the RAM 103 or the like. The shift flag provides information that indicates whether a data unit that includes packets received by each of the network I/Fs 104a to 104c has shifted from a first data unit to a second data unit. If the data unit has shifted, "ON" is set in the shift flag, and if the data unit has not shifted, "OFF" is set in the shift flag.

If the shift flag is "ON" (YES in step S405), the processing proceeds to step S409. If the shift flag is "OFF" (NO in step S405), the processing proceeds to step S406.

In step S406, the CPU 101 extracts the sequence number from the received packet. The CPU 101 then determines whether the extracted sequence number, i.e., the sequence number of the received packet and the sequence number of an immediately preceding packet received through the target reception path are consecutive numbers.

A case in which the two sequence numbers are consecutive numbers indicates that the data unit that includes the immediately preceding received packet is identical to the data unit that includes the currently received packet. Meanwhile, a case in which the two sequence numbers are not consecutive numbers indicates that the data unit that includes the immediately preceding received packet is different from the data unit that includes the currently received packet. Specifically, a case in which the two sequence numbers are not consecutive numbers indicates that the data unit that includes the received packet has shifted from the first data unit to the second data unit. In other words, the processing in step S406 is an example of detection processing for detecting a shift of the data unit.

If the two sequence numbers are consecutive numbers (YES in step S406), the processing proceeds to step S407. If the two sequence numbers are not consecutive numbers (NO in step S406), the CPU 101 determines that the shift in the packets has been detected, and the processing then proceeds to step S408.

In step S407, the CPU 101 extracts the marker bit from the received packet and detects ON/OFF of a value of the marker bit (detection processing). If the value of the marker bit is "ON" (YES in step S407), the processing proceeds to step S408. If the value in the marker bit is "OFF" (NO in step S407), the processing proceeds to step S411.

In step S408, the CPU 101 sets "ON" in the shift flag of the target reception path. Subsequently, in step S409, the CPU 101 detects ON/OFF of the shift flags of the entire reception paths. If the shift flags of all the reception paths are "ON" (YES in step S409), the processing proceeds to step S410. If a reception path of which shift flag is "OFF" is present (NO in step S409), the processing proceeds to step S411.

In step S410, the CPU 101 checks the presence of a missing subflow sequence number in each of the reception buffers 204a to 204c. The processing in step S410 is an example of the determination processing for determining the presence of a not-yet-received packet. If there is a missing subflow sequence number (YES in step S410), the processing proceeds to step S411. If there is no missing subflow sequence number (NO in step S410), the processing proceeds to step S412.

In step S411, the CPU 101 calculates the time that has passed since a timing at which an immediately preceding re-order processing has been performed until a point of time when the processing in step S411 is performed. If the calculated time is equal to or greater than a predetermine period of time, or in other words, if the predetermined period of time has passed since the timing at which an immediately preceding instance of the re-order processing has been performed (YES in step S411), the processing proceeds to step S412. If the predetermined period of time has not passed (NO in step S411), the processing returns to step S401.

In step S412, the CPU 101 (the re-order unit 210) performs the re-order processing. Specifically, the CPU 101 re-orders (reconstructs) the plurality of packets stored in each of the reception buffers 204a to 204c in the order of the sequence numbers. The CPU 101 then passes the reconstructed media data to an upper layer module. Subsequently, in step S413, the CPU 101 sets "OFF" in the shift flags of the entire reception paths to initialize the shift flags, and the processing then returns to step S401.

Figure 5:
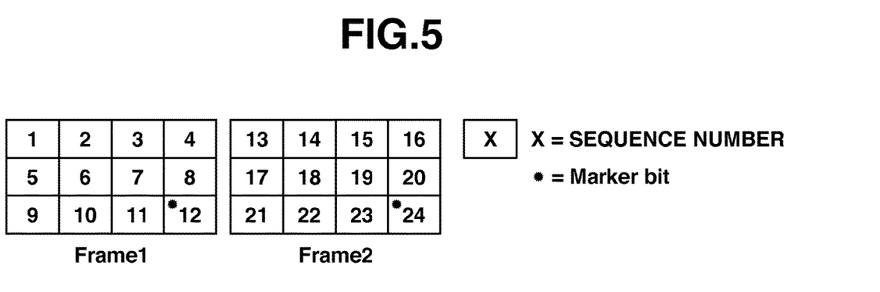
FIG. 5 is a diagram illustrating an example of media data.

The reception processing will now be described in detail with reference to FIGS. 5, 6A, and 6B. FIG. 5 is a diagram illustrating an example of the media data. According to the present exemplary embodiment, the media data is video data. Video frames 1 and 2 illustrated in FIG. 5 are examples of data units included in the media data. Each of the video frames 1 and 2 is a data unit, and each data unit includes 12 packets. The sequence number is indicated at the center of each packet.

Figure 6A:
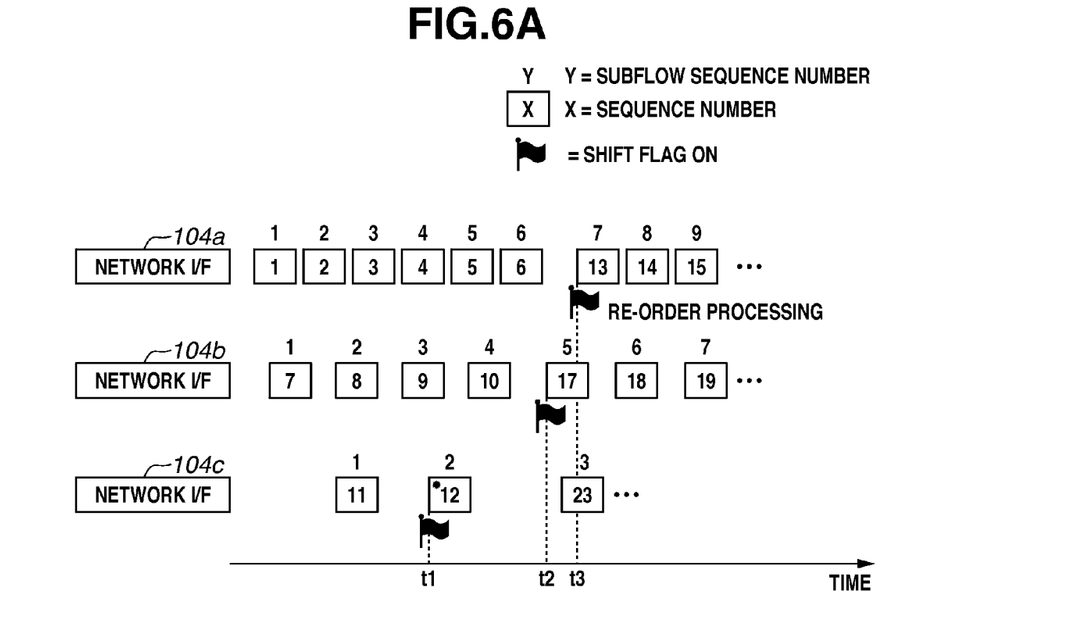
FIGS. 6A and 6B are diagrams each illustrating a reception timing of each packet forming the media data.
Figure 6B:
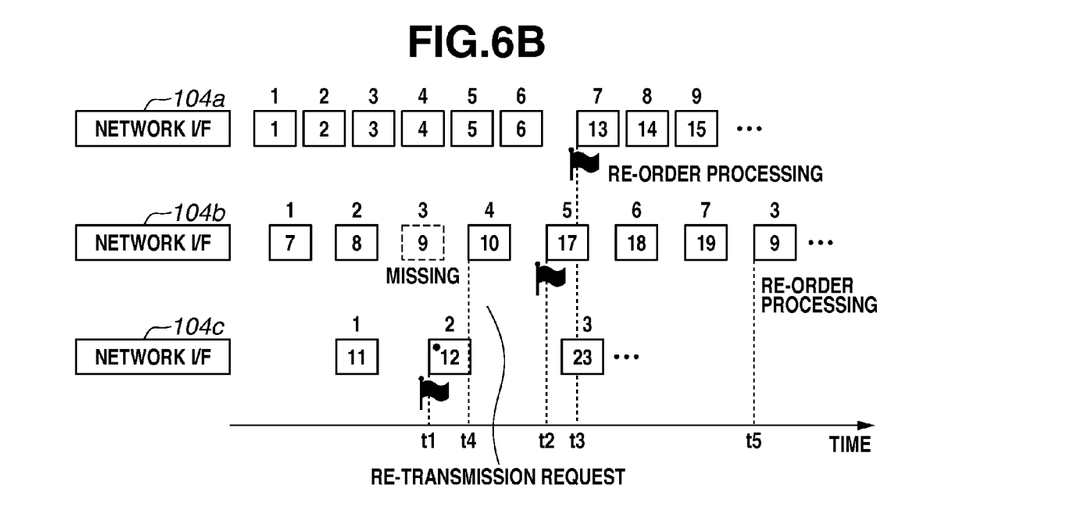

FIGS. 6A and 6B are diagrams each illustrating reception timings at which the network I/Fs 104a to 104c receive the packets forming the media data illustrated in FIG. 5. The horizontal axis corresponds to a time axis. In addition, the subflow sequence number is indicated at the top of each packet.

In the reception example illustrated in FIGS. 6A and 6B, the network I/F 104a receives the packets with the sequence numbers 1 to 6 of the video frame 1. In addition, the network I/F 104b receives the packets with the sequence numbers 7 to 10 of the video frame 1. The network I/F 104c receives the packets with the sequence numbers 11 and 12 of the video frame 1.

In this case, in response to the network I/F 104c receiving the packet with the sequence number 12 of which marker bit is "ON," the CPU 101 sets "ON" in the shift flag corresponding to the network I/F 104c at a timing t1. At this point, the shift flags of the network I/Fs 104a and 104b are "OFF." Thus, the re-order processing is not performed at this point.

Subsequently, the network I/F 104b receives the packet with the sequence number 17 of the video frame 2. The sequence number of the packet which the network I/F 104b has received immediately before the packet with the sequence number 17 is 10. In other words, the two sequence numbers are not consecutive numbers, and thus the CPU 101 sets "ON" in the shift flag of the network I/F 104b at a timing t2.

Then, in response to the network I/F 104a receiving the packet with the sequence number 13 forming the video frame 2, the CPU 101 sets "ON" in the shift flag of the network I/F 104a at a timing t3. At this point, the shift flags of the entire network I/Fs 104a to 104c are "ON."

At this point, the CPU 101 checks the presence of a not-yet-received packet. In the reception example illustrated in FIG. 6A, the entire packets have been received, and thus the CPU 101 determines that there is no not-yet-received packet and performs the re-order processing.

Meanwhile, in the reception example illustrated in FIG. 6B, the packet with the sequence number 9 and the subflow sequence number 3 is missing in the network I/F 104b. Therefore, at a timing t4, the CPU 101 transmits a re-transmission request to the transmission apparatus 11. In the reception example illustrated in FIG. 6B, the timing t4 precedes the timing t2.

Furthermore, at a timing (t3) at which the entire shift flags become "ON," the packet with the sequence number 9, which has been requested to be retransmitted, of the media data has not been received. Therefore, in the reception example illustrated in FIG. 6B, the re-order processing has not started at the timing t3. At a timing t5, then, upon the packet with the sequence number 9, which has been requested to be retransmitted, of the media data being received, the CPU 101 starts the re-order processing at this timing.

As described above, the reception apparatus 10 according to the present exemplary embodiment performs the re-order processing, in a case where shifting of the data unit has been detected in the entire network I/Fs 104a to 104c. Through this, the reception apparatus 10 can perform the re-order processing and the decoding processing at high speed on a data unit by data unit basis. In other words, the reception apparatus 10 can optimize the re-order timing in the multi-path transmission and improve the real-time reproduction performance and the reproduction quality of the media data.

A first modification example of the reception apparatus 10 according to the first exemplary embodiment will now be described. As the first modification example, by transmitting a re-transmission request prior to the re-order processing, the reception apparatus 10 does not need to perform the processing for receiving a not-yet-received packet. In this case, the reception apparatus 10 starts the re-order processing in a state in which there is a not-yet-received packet. The reception apparatus 10 may then transmit the re-transmission request for the not-yet-received packet after the re-order processing and may receive the not-yet-received packet.

In addition, as a second modification example, in step S409, the reception apparatus 10 may start the re-order processing if the shift flags of part of the network I/Fs 104a to 104c are "ON," instead of the shift flags of the entire network I/Fs 104a to 104c being "ON." The stated part of the network I/Fs 104a to 104c may, for example, be network I/Fs each corresponding to an active path. In this case, the reception apparatus 10 receives an active path notification in advance from the transmission apparatus 11.

The active path may be statically determined when the transmission apparatus 11 establishes a network connection, or as another example, the active path may be dynamically changed in accordance with a band or a delay of the network. In this case, the reception apparatus 10 receives the active path notification each time the active path is changed.

Furthermore, as yet another example, part of the network I/Fs 104a to 104c may be set in advance.

As a third modification example, although an example of the multipath RTP has been described as the sequence number or the subflow sequence number of a packet in the present exemplary embodiment, the present exemplary embodiment is not limited thereto, and another protocol or an original protocol may instead be used.

A reception apparatus 10 according to a second exemplary embodiment will now be described. The reception apparatus 10 according to the second exemplary embodiment detects a shift of the data unit by comparing the sequence number of a final packet of a data unit in which a marker bit "1" is indicated as the boundary information with the sequence number of a received packet.

Figure 7:
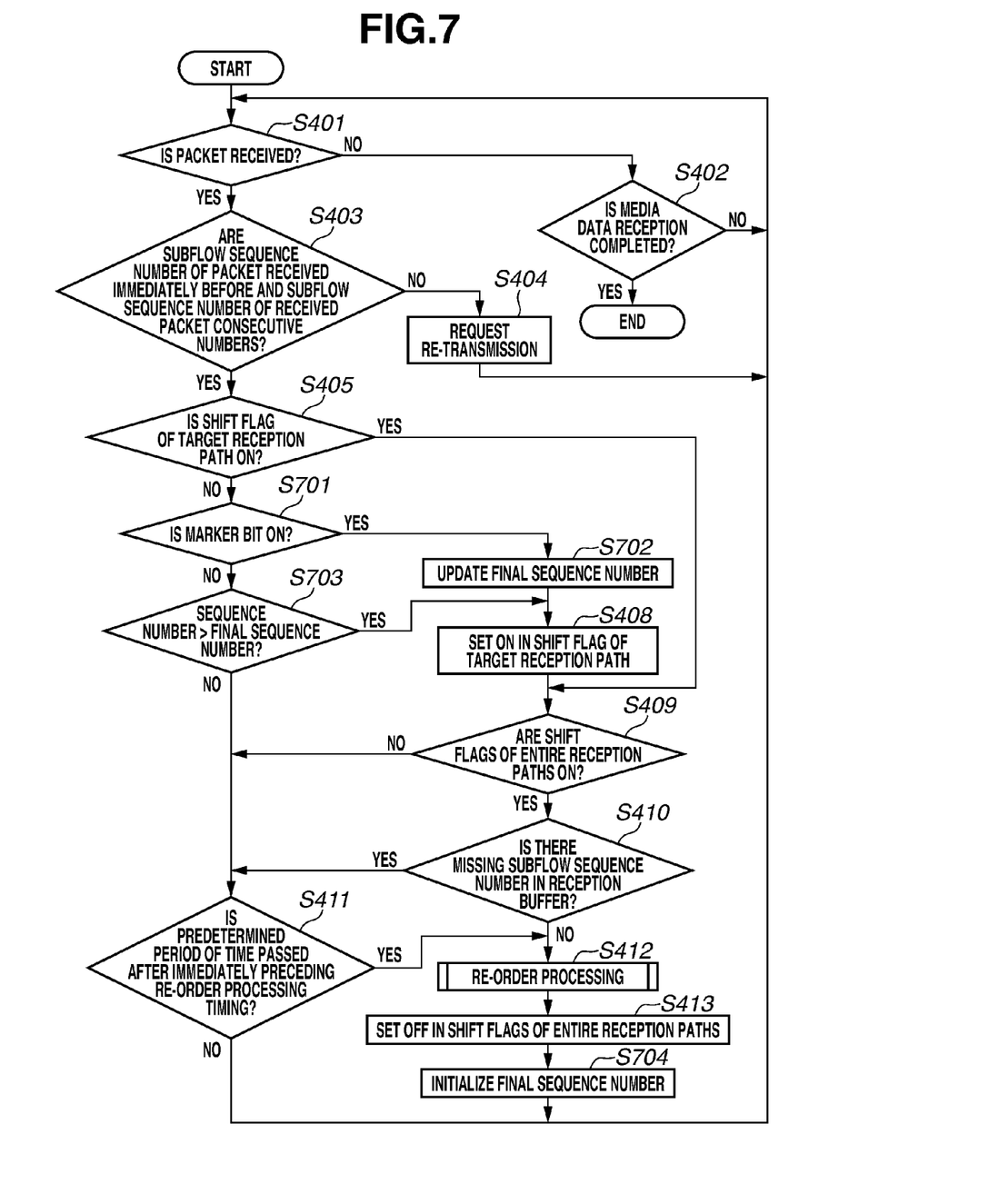
FIG. 7 is a flowchart illustrating reception/transmission processing.

FIG. 7 is a flowchart illustrating reception processing of the reception apparatus 10 according to the second exemplary embodiment. Here, part of the processing that is different from that of the reception processing according to the first exemplary embodiment will be described. Processes that are identical to those of the reception processing according to the first exemplary embodiment are given identical numbers.

In step S405, if the shift flag of the target reception path is "OFF" (NO in step S405), the processing proceeds to step S701. In step S701, the CPU 101 detects ON/OFF of the marker bit. If the marker bit is "ON" (YES in step S701), the processing proceeds to step S702. If the marker bit is "OFF" (NO in step S701), the processing proceeds to step S703.

In step S702, the CPU 101 identifies the sequence number of the received packet of which marker bit is "ON" as the final sequence number and stores the final sequence number into a storage unit, such as the RAM 103. The final sequence number can be referred to in program modules of the entire reception paths including the network I/F (reception path) through which the received packet has been received.

Here, the packet to which the final sequence number is appended is the final packet arrayed at the end of the data unit, and the processing in step S702 is an example of identification processing for identifying the array sequence (the sequence number) of the final packet.

In step S703, the CPU 101 compares the sequence number of the received packet with the final sequence number. If the sequence number of the received packet is greater than the final sequence number (YES in step S703), the processing proceeds to step S408. If the sequence number of the received packet is equal to or less than the final sequence number (NO in step S703), the processing proceeds to step S411.

In addition, after the processing in step S413, in step S704, the CPU 101 initializes the final sequence number. This initialization is a process for preventing the final sequence number in the data unit on which the re-order processing has started from being compared with the sequence number of the received packet in the processing in step S703.

The initial value of the final sequence number may be a logical maximum value in the data to be received by the reception apparatus 10. As another example, in step S704, the CPU 101 may make the final sequence number unavailable for reference, instead of initializing the final sequence number. After the processing in step S704, the processing returns to step S401.

The configuration and the processing aside from those described above of the reception apparatus 10 according to the second exemplary embodiment are the same as the configuration and the processing of the reception apparatus 10 according to the first exemplary embodiment.

In this manner, the reception apparatus 10 according to the second exemplary embodiment can detect a shift of the data unit in each reception path by comparing the sequence number of the final packet in the data unit with the sequence number of the received packet. In this manner, the reception apparatus 10 can perform the re-order processing and the decoding processing at high speed on a data unit by data unit basis. In other words, the reception apparatus 10 can optimize the re-order timing in the multipath transmission and improve the real-time reproduction performance and the reproduction quality of the media data.

As described above, according to the exemplary embodiments, the re-order timing in the multipath transmission can be optimized, and the real-time reproduction performance and the reproduction quality of the media data can be enhanced.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-139048 filed Jul. 2, 2013, which is hereby incorporated by reference herein in its entirety.

What is claimed is:

1. A reception apparatus, comprising:
a plurality of receivers, each corresponding to a communication path among a plurality of communication paths connecting the reception apparatus with a transmission apparatus, and configured to receive a plurality of divided data units obtained by dividing a data unit; and
a processor coupled to a memory, wherein the processor executes:
sorting, at a time according to both reception of a last divided data unit of a first data unit by a first receiver of the plurality of receivers and reception of a divided data unit of a second data unit by a second receiver of the plurality of receivers, a plurality of divided data units of the first data unit received by the plurality of receivers wherein the second data unit is transmitted after transmission of the first data unit by the transmission apparatus; and
performing reproduction of the plurality of divided data units of the first data unit according to order sorted in the sorting.

2. The reception apparatus according to claim 1, wherein the data unit corresponds to a video frame, and the divided data unit is a packet.

3. The reception apparatus according to claim 1, wherein the processor further executes:
obtaining a sequence number indicating transmission order of a divided data unit received by a receiver of the plurality of receivers; and
determining, based on the obtained sequence number, that the second receiver has received a divided data unit of the second data unit, and
wherein in the sorting, the plurality of divided data units of the first data unit received by the plurality of receivers are sorted at the time according to both reception of the last divided data unit of the first data unit by the first receiver and the determination that the second receiver has received a divided data unit of the second data unit.

4. The reception apparatus according to claim 1, wherein the processor further executes:
obtaining a subflow sequence number indicating transmission order, in a communication path, of a divided data unit received by a receiver of the plurality of receivers; and
determining, based on the obtained subflow sequence number, whether there is any divided data unit which has been transmitted by the transmission apparatus but has not been received by the plurality of receivers, and wherein,
in the sorting, the plurality of divided data units of the first data unit received by the plurality of receivers, are sorted according to the determination that there is no divided data unit which has been transmitted by the transmission apparatus but has not been received by the plurality of receivers.

5. The reception apparatus according to claim 1,
wherein in the sorting, the plurality of divided data units of the first data unit received by the plurality of receivers are sorted even if the second receiver has not received a divided data unit of the second data unit, in a case where a predetermined period of time has passed after sorting of a plurality of divided data units corresponding to a third data unit which is transmitted before the first data unit by the transmission apparatus.

6. A method for controlling a reception apparatus, the method comprising:
receiving a plurality of divided data units obtained by dividing a data unit with a plurality of receivers corresponding to a plurality of communication paths connecting the reception apparatus with a transmission apparatus;
sorting, at a time according to both reception of a last divided data unit of a first data unit by a first receiver of the plurality of receivers and reception of a divided data unit of a second data unit by a second receiver of the plurality of receivers, a plurality of divided data units of the first data unit received by the plurality of receivers wherein the second data unit is transmitted after the first data unit by the transmission apparatus; and
performing reproduction of the plurality of divided data units of the first data unit according to order sorted in the sorting.

7. The method according to claim 6, further comprising:
obtaining a sequence number indicating transmission order of a divided data unit received by a receiver of the plurality of receivers; and
determining, based on the obtained sequence number, that the second receiver has received a divided data unit of the second data unit, and wherein
in the sorting, the plurality of divided data units of the first data unit received by the plurality of receivers are sorted at the time according to both reception of the last divided data unit of the first data unit by the first receiver and the determination that the second receiver has received a divided data unit of the second data unit.

8. A non-transitory recording medium recording a program that causes a computer to execute:
  receiving a plurality of divided data units obtained by dividing a data unit with a plurality of receivers corresponding to a plurality of communication paths connecting the reception apparatus with a transmission apparatus;
  sorting, at a time according to both reception of a last divided data unit of a first data unit by a first receiver of the plurality of receivers and reception of a divided data unit of a second data unit by a second receiver of the plurality of receivers, a plurality of divided data units of the first data unit received by the plurality of receivers wherein the second data unit is transmitted after the first data unit by the transmission apparatus; and
  performing reproduction of the plurality of divided data units of the first data unit according to order sorted in the sorting.

9. The non-transitory recording medium storing the program according to claim 8, wherein the program causes the computer to further execute:
  obtaining a sequence number indicating transmission order of a divided data unit received by a receiver of the plurality of receivers; and
  determining, based on the obtained sequence number, that the second receiver has received a divided data unit of the second data unit,
  wherein in the sorting, the plurality of divided data units of the first data unit received by the plurality of receivers are sorted at the time according to both reception of the last divided data unit of the first data unit by the first receiver and the determination that the second receiver has received a divided data unit of the second data unit.

10. The reception apparatus according to claim 3, wherein in the determining, in a case where nonconsecutive sequence numbers of divided data units received by the second receiver are obtained in the obtaining, it is determined that the second receiver has received a divided data unit of the second data unit.

11. The reception apparatus according to claim 3, wherein in the determining, in a case where the obtained sequence number of a divided data unit received by the second receiver is greater than a sequence number of the last divided data unit received by the first receiver, it is determined that the second receiver has received a divided data unit of the second data unit.

12. The reception apparatus according to claim 3, wherein the processor further executes:
  determining, based on identification information included in a divided data unit received by the first receiver, that the first receiver has received the last divided data unit of the first data unit, the identification information indicating last of a data unit, and
  wherein in the sorting, the plurality of divided data units of the first data unit received by the plurality of receivers are sorted at the time according to both the determination that the first receiver has received the last divided data unit of the first data unit and the determination that the second receiver has received a divided data unit of the second data unit.

13. The reception apparatus according to claim 1, wherein in the sorting, the plurality of divided data units of the first data unit received by the plurality of receivers are sorted at the time according to both reception of the last divided data unit of the first data unit by the first receiver and reception of divided data units of the second data unit by all of the plurality of receivers except the first receiver.

* * * * *